July 29, 1952 L. K. NEHER 2,605,358

LOW PASS FILTER

Filed Jan. 30, 1946

INVENTOR
LELAND K. NEHER

BY M. O. Hayes

ATTORNEY

Patented July 29, 1952 2,605,358

UNITED STATES PATENT OFFICE 2,605,358

LOW PASS FILTER

Leland K. Neher, San Francisco, Calif., assignor, by mesne assignments, to the United States of America as represented by the Secretary of the Navy Application January 30, 1946, Serial No. 644,392

4 Claims. (Cl. 178—44)

This invention relates to electrical filter circuits and more particularly to electrical filter circuits incorporating an amplifier to provide sharper frequency cutoff characteristics.

Heretofore electrical filters had rather broad frequency cutoff characteristics with the accompanying disadvantage of not providing the sharp cutoff necessary in many electrical circuits.

The general object of the present invention is to overcome the foregoing difficulties.

Another object is to provide a filter circuit having sharper frequency cutoff characteristics.

A further object is to provide an electrical filter circuit utilizing an electronic amplifier to provide sharper frequency cutoff characteristics.

This invention accomplishes the foregoing general objects and more specific objects which hereinafter appear, and resides in the circuit elements and their relation one to another, as are more particularly described in the following specification. The specification is accompanied by a drawing in which.

Figure 1:
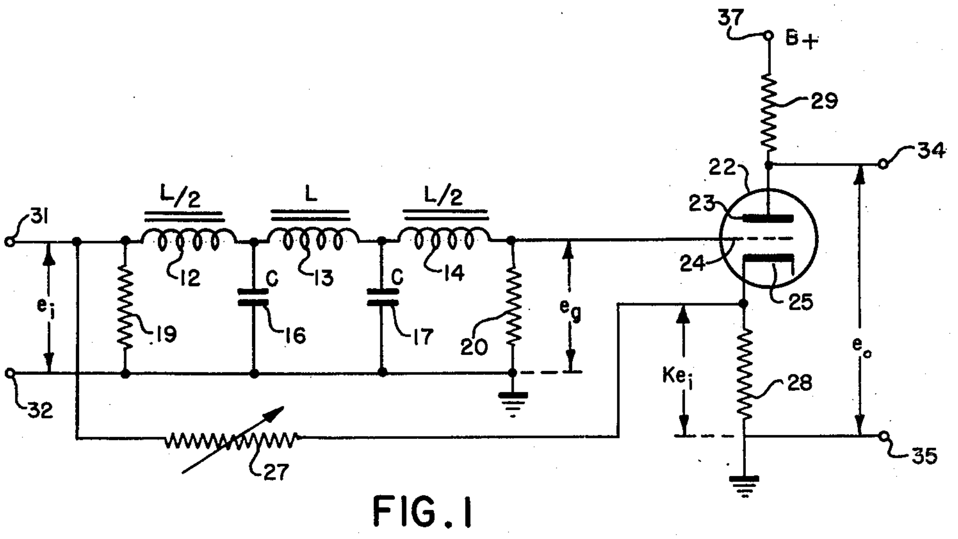
Fig. 1 is a schematic illustration of one form of the invention.

Referring to the drawings, and more particularly Fig. 1, an electrical filter network is disclosed having inductors 12, 13, and 14, and capacitors 16 and 17. This filter is properly terminated at its input and output by resistors 19 and 20 respectively. A source of voltage to be filtered is connected to the input terminals 31 and 32 of the filter and is shown in the drawing as $e_i$. A thermionic tube 22 is provided having its grid 24 connected to the output of the filter, the voltage at this connection being shown in the drawing as $e_g$. The source of voltage $e_i$ is also connected, through a voltage divider comprising a variable resistor 27 and cathode resistor 28, to the cathode 25 of thermionic tube 22 producing at the cathode 25 a fraction of the voltage $e_i$, this fractional voltage at the cathode being shown in the drawing as $Ke_i$. The plate 23 of thermionic tube 22 is connected to a positive source of potential at 37 through the resistor 29. The voltage output, shown in the drawing as $e_o$, from this circuit is obtained at the output terminals 34 and 35, terminal 34 being connected to the plate 23 and terminal 35 being connected to ground.

The filter shown in Fig. 1 is of the low-pass type and is composed of T-sections, each section having two series arms of inductance, L/2, and a shunt arm of capacitance C. Now for such a filter the cutoff frequency is $$F_{co}=1/\pi\sqrt{LC}$$

where $F_{co}$ is the frequency at which noticeable attenuation begins to take place, L is the total inductance of one section, and C is the capacitance of one section.

Also, for a single section the output voltage shifts phase from 0° to 180° with respect to the input voltage as the frequency is increased from zero to $F_{co}$ in the case of an ideal filter. Essentially the same conditions prevail in an actual filter having low losses. Thus a filter can be designed to have any selected cutoff frequency. For a several section filter the total phase shift at a particular frequency will be the sum of the phase shifts of each section and the overall attenuation will be the sum of the attenuations of each section.

Figure 3:
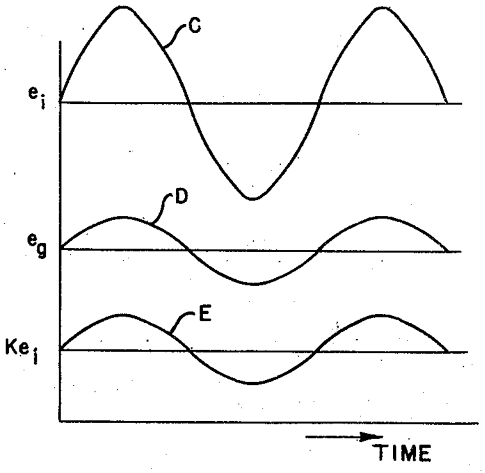
Fig. 3 depicts graphs useful in explaining the invention.

For a two section filter as shown in Fig. 1, at some frequency near $F_{co}$ the output voltage of the filter $e_g$, shown as curve D of Fig. 3, will lag the input voltage $e_i$, shown as curve C of Fig. 3, by 180°+180° or 360° thus being in phase with it and the voltage $Ke_i$, shown as curve E of Fig. 3. Also, due to the normal attenuation of the filter, $e_g$ will have a smaller amplitude than $e_i$ as is shown by the relative amplitudes of curves D and C respectively. Now, if variable resistor 27 is adjusted so that $Ke_i$ is equal in amplitude to $e_g$ (as shown in curves D and E of Fig. 3), then the grid 24 will not change its potential with respect to its cathode 25 and thus there will be no change in potential at the plate 23 with the result that the output voltage $e_o$ at terminal 34 will be essentially zero for some frequency near $F_{co}$. As the frequency is decreased from this particular frequency near $F_{co}$ the output voltage $e_o$ rises quite rapidly until it reaches a fairly constant value, and as the frequency is increased from this particular frequency near $F_{co}$ the output voltage $e_o$ will remain at a fairly low value. Thus it is seen that this invention takes advantage of the phase shift which normally takes place in a filter network.

Figure 2:
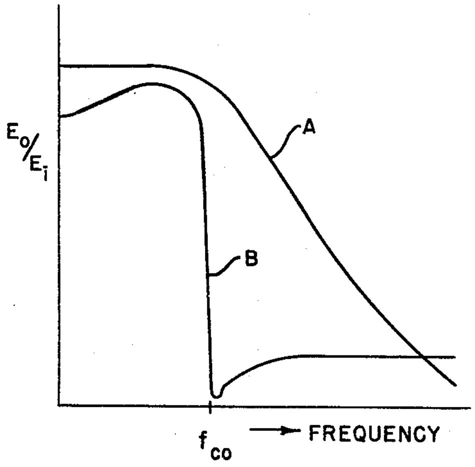
Fig. 2 depicts graphs showing the comparative effectiveness of the invention.

The sharper frequency cutoff characteristic of this invention is apparent from curve B of Fig. 2 showing the attenuation of this circuit as a function of frequency. Curve A of Fig. 2 shows the attenuation characteristic of the filter alone and is seen to be less sharp at $F_{co}$ than curve B. The curves A and B are not necessarily plotted to the same vertical scale, $E_o/E_i$, but are plotted to the same frequency scale.

The invention described in the foregoing specification need not be limited to the details shown, which are considered to be illustrative of one form the invention may take. It is to be understood that while the invention has been disclosed in connection with a low-pass filter using T-sections, the invention may be used with any type of low-pass, high-pass, band-pass, or band-elimination filter which produces a phase shift of essentially 360° near its desired cutoff frequencies. It is to be further understood that the invention would work equally as well with the connections to grid 24 and cathode 25 interchanged.

What is claimed is:

1. An electrical circuit for filtering an input signal, said circuit comprising, a first terminal, a second terminal, a point of reference potential, said input signal appearing between said first terminal and said reference potential point, a filter network having an input circuit and an output circuit, said input circuit being coupled across said first terminal and said reference potential point, said output circuit being coupled across said second terminal and said reference potential point, said filter network at a number of predetermined frequencies of said input signal being adapted to provide at its output circuit a predetermined output signal, said predetermined output signal being in phase agreement with said input signal and having an amplitude that is a predetermined fraction of the amplitude of said input signal, an electron tube having at least an anode, a control grid and a cathode, means coupling said second terminal to said control grid, a cathode resistor returning said cathode to said reference potential point, a source of positive supply potential, an impedance returning said anode to said positive potential source, a variable resistor connected between said first terminal and said cathode for coupling a controllable fraction of said input signal across said cathode resistor, and means for abstracting the output appearing between said anode and said reference potential point, whereby when said variable resistor is adjusted so that at said predetermined frequencies said fraction of input signal coupled across said cathode resistor is equal in amplitude and in phase to the signal appearing at the output circuit of said filter network, said abstracted output is substantially zero.

2. An electrical circuit for filtering an input signal, said circuit comprising, a first terminal, a second terminal, a point of reference potential, said input signal appearing between said first terminal and said reference potential point, a filter network having an input circuit and an output circuit, said input circuit being coupled between said first terminal and said reference potential point, said output circuit being coupled between said second terminal and said reference potential point, said filter network comprising third and fourth terminals, an inductor of inductance L coupled between said third and fourth terminals, an inductor of inductance L/2 coupled between said first and third terminals, an inductor of inductance L/2 coupled between said second and fourth terminals and a capacitor of capacitance C coupled beween each of said third and fourth terminals and said reference potential point, where the cutoff frequency of said filter network is equal to $1/\pi\sqrt{LC}$; a terminating resistor coupled between each of said first and second terminals and said reference potential point, said filter network at a predetermined frequency being adapted to provide at its output circuit a predetermined output signal, said predetermined output signal being in phase agreement with said input signal and having an amplitude that is a predetermined fraction of the amplitude of sad input signal, an electron tube having at least an anode, a control grid and a cathode, means coupling said second terminal to said control grid, a cathode resistor returning said cathode to said reference potential point, a source of positive supply potential, a resistor returning said anode to said positive potential source, a variable resistor connected between said first terminal and said cathode for coupling a controllable fraction of said input signal across said cathode resistor, and means for abstracting the output appearing between said anode and said reference potential point, whereby, when said variable resistor is adjusted so that at said predetermined frequency said fraction of input signal coupled across said cathode resistor is equal in phase and in amplitude to the signal appearing at the output circuit of said filter network, said abstracted output is substantially zero.

3. An electrical filter circuit comprising a low pass filter having an even number of T sections, each of said sections having two series inductance arms and a shunt capacitance arm, said filter network at a predetermined frequency being adapted to provide an output signal having phase agreement with an input signal at an amplitude that is a predetermined fraction of said input signal, an amplifier including an electron tube having at least an anode, a control grid and a cathode, means to couple the output of said filter to said control grid, a variable resistor connected to apply to said cathode a controllable fraction of the input signal to said filter, said last-named fraction being equal in amplitude and phase to the output of said filter at said predetermined frequency, and means coupled to said anode for abstracting the amplified grid-to-cathode signal of said tube.

4. An electrical filter circuit comprising a filter section adapted to shift the phase of an input signal applied to the input thereof from 0° to N times 360° with respect to said input signal as the frequency is increased from zero to a predetermined frequency, N being any integer, an amplifier including an electron tube having at least an anode, a control grid and a cathode, means coupling the output of said filter to said control grid, a variable resistor connected between the input of said filter and said cathode and adjustable to couple to said cathode a fraction of said input signal, said fraction having amplitude and phase equal to the output of said filter at said predetermined frequency, and means coupled to the anode of said tube for abstracting the amplified grid-to-cathode signal.

LELAND K. NEHER.

REFERENCES CITED

The following references are of record in the file of this patent:

UNITED STATES PATENTS

| Number | Name | Date |
|---|---|---|
| 2,072,946 | Farnham | Mar. 9, 1937 |
| 2,185,389 | Wheeler | Jan. 2, 1940 |
| 2,211,942 | White | Aug. 20, 1940 |
| 2,298,177 | Scott | Oct. 6, 1942 |
| 2,309,852 | Lewis | Feb. 2, 1943 |